June 4, 1946.  A. V. BEDFORD  2,401,404
ELECTRICAL MULTIPLYING CIRCUIT
Filed Jan. 12, 1944  3 Sheets-Sheet 2

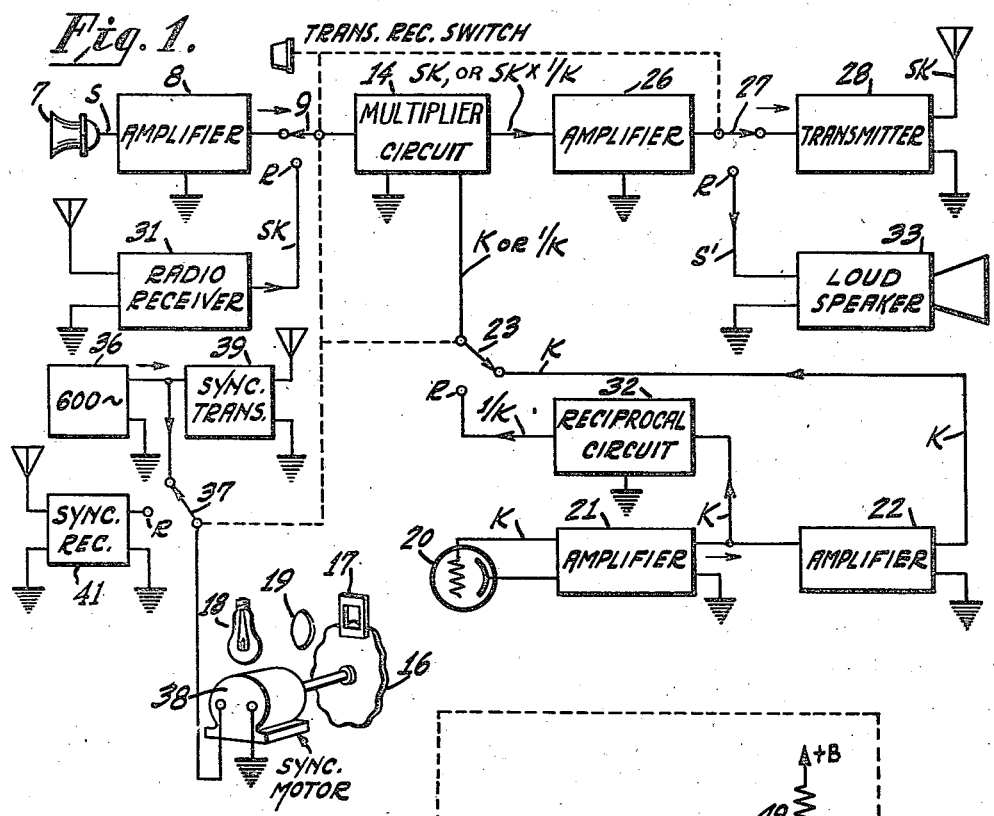
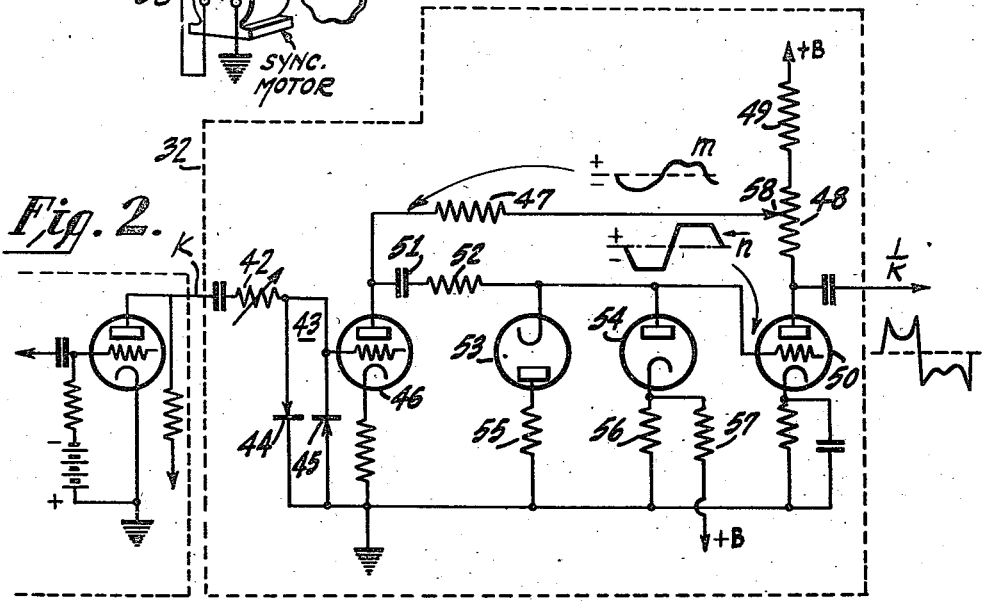

INVENTOR.
ALDA V. BEDFORD
BY
ATTORNEY

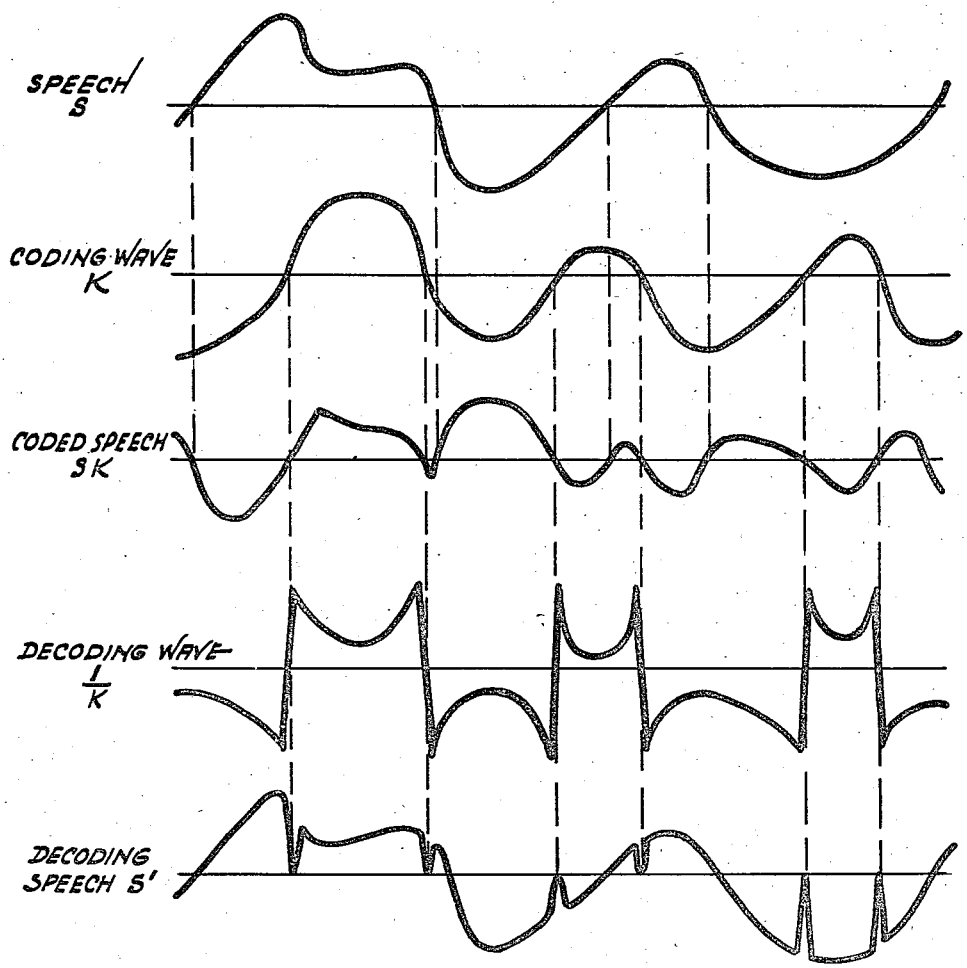

Patented June 4, 1946

2,401,404

UNITED STATES PATENT OFFICE 2,401,404

ELECTRICAL MULTIPLYING CIRCUIT

Alda Vernon Bedford, Princeton, N. J., assignor to Radio Corporation of America, a corporation of Delaware Application January 12, 1944, Serial No. 517,967

10 Claims. (Cl. 179—1.5)

The present invention relates to secret communication systems and more particularly to an apparatus and method for the multiplication of voltages to obtain the product of two signals for use in such a secret system.

One form of such a communication system is shown in my copending application Serial No. 456,578, filed August 29, 1942, while in the copending application of Frank P. Wipff, Serial No. 484,303, filed April 23, 1943, one form of multiplier circuit is shown for use in the foregoing system. In the system of my prior application, the speech or other communication signal S is multiplied by a coding signal K to obtain the product SK which is transmitted. At the receiver the incoming signal SK is multiplied by the reciprocal of the coding signal K to obtain the original signal S, that is, $SK \times 1/K = S$. In this system, the product SK is obtained by putting the positive cycles of either the signal S or the signal K on a carrier wave and then passing it through a modulator tube which has its bias varied by the positive cycles of the other signal. The same thing is done with the negative cycles of the signals after they have been reversed in polarity. The several product components are then added together with the correct polarity to obtain the product SK.

An object of the present invention is to provide an improved and simplified method of and means for multiplying two signal voltages by each other to obtain a product.

Another object of the invention is to provide a multiplying circuit wherein devices have the property of providing an instantaneous voltage which is proportional to the square of the instantaneous input voltage for reasonable swing in a single polarity.

A further object is to provide a multiplying circuit wherein the spurious components of the output signal are reduced.

A further object is to provide an improved circuit for obtaining the product of two electrical signals, such as the mentioned signals S and K without having the signals S and K per se appear in the output.

A further objects of the invention is to provide an improved system for secret signalling.

In the accompanying drawings,

Figure 1 is a block diagram of signalling apparatus embodying the invention.

Figure 2 is a circuit diagram of a reciprocal circuit that may be employed in the system of Fig. 1.

Figure 7 is a group of graphs which are referred to in explaining the invention.

In the several figures, similar parts are indicated by similar reference characters.

Figure 3:
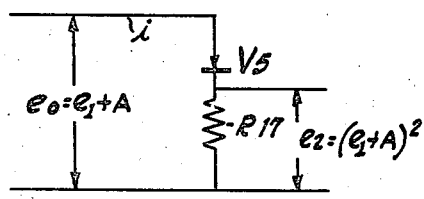
Figure 3 is a circuit which is referred to in explaining the invention.

Referring to Fig. 1, the invention is shown applied to radio apparatus that may be switched for operation either as a transmitter or as a receiver. The several switches are shown in the position for transmitter operation. This is the operation of the apparatus that will first be described. A microphone and a speech amplifier are shown at 7 and 8, respectively. The signal S is applied through a switch 9 to a multiplier unit 14 which preferably is designed in accordance with the present invention. The code signal K may be produced by means of a code disc 16, a mask 17, a light source 18, a condensing lens 19, and a photoelectric cell 20. The signal K is supplied through amplifiers 21 and 22 and through a switch to the multiplier unit 14. The resulting multiplier output signal SK, which is unintelligible, is supplied through an amplifier 26 and through a switch 27 to a radio transmitter 28 or to a wire line, if preferred.

The shape of the waves S, K and SK are shown in Fig. 7.

Figure 6:
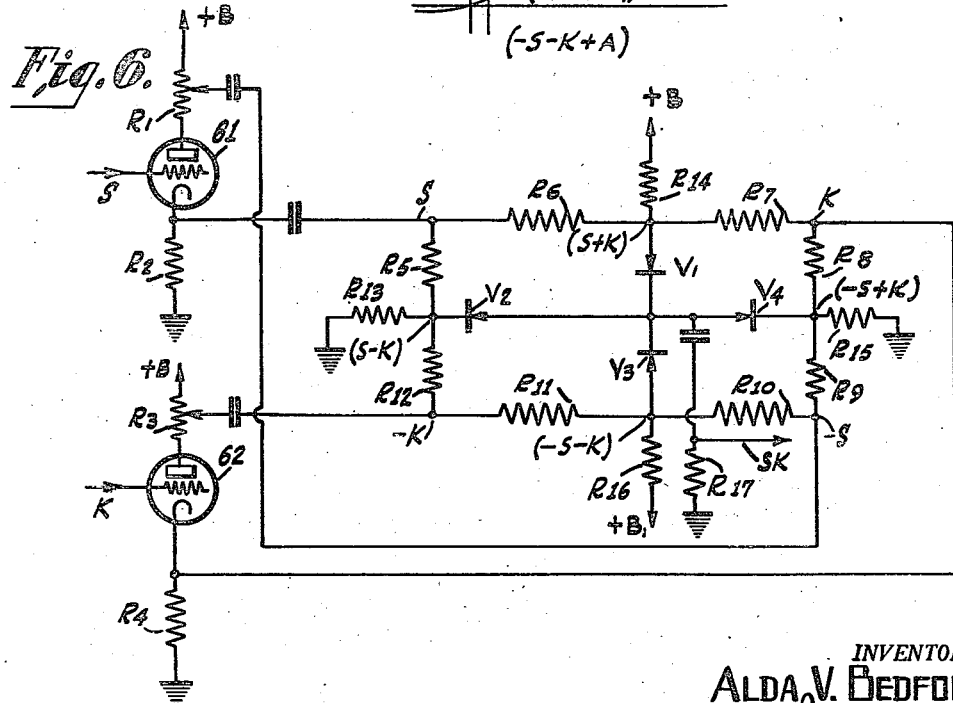
Figure 6 is a circuit diagram of the preferred embodiment of the invention.

The receiver for decoding the signal SK may be the same apparatus as in Fig. 1 with switches 9, 23 and 27 thrown to their contact positions R. The multiplier 14 is unchanged. The signal SK is supplied from a radio receiver 31 through the switch 9 to the multiplier 14. The coding signal K produced by the disc 16 is supplied through the amplifier 21 to a reciprocal circuit 32 which may be designed in accordance with the invention described and claimed in application Serial No. 484,304, filed April 23, 1943, in the name of Carl A. Meneley, and entitled Reciprocal circuits. The reciprocal circuit of this type is shown in Fig. 6. The reciprocal circuit 32 supplies the decoding signal 1/K through the switch 23 to the multiplier 14. The resulting output of multiplier 14 resembles the original communication signal S since $Sk \times 1/K = S$, as shown by wave S' in Fig. 7. The decoded speech signal S' is amplified by the amplifier 26 and supplied through the switch 27 to headphones or to the loudspeaker 33.

The code disc 16 at the transmitter and the corresponding code disc at the receiver are held in synchronism and in the proper phase relation by suitable synchronizing means. For example, at the transmitter a 600-cycle per second current from a source 36 may be supplied through a switch 37 to a synchronous motor 38 which rotates the code disc 16. The 600-cycle current also modulates a radio transmitter 39 for the transmission of synchronizing signal to the receiver. At the receiver the switch 37 is in its contact position R whereby the received 600-cycle current is supplied from a radio receiver 41 to the synchronous motor 38. In some cases it may be preferable to transmit the synchronizing signal over a wire line.

Fig. 2 shows, by way of example, one circuit that may be employed to obtain the reciprocal wave 1/K. This circuit is described and claimed in the above-mentioned Meneley application. The resistor 42 is of high enough resistance so that the driving source for the non-linear resistance unit 43 is of high impedance whereby there is only a slight variation in the current flow through unit 43. The unit 43 may consist of a pair of copper oxide rectifiers 44 and 45 connected to conduct current in opposite directions.

The voltage appearing across the non-linear unit 43 has a flattened wave form as shown at M. This voltage is amplified by a cathode-biased vacuum tube 46 and appears with reversed polarity across an anode resistor 47 and a portion of the resistor 48—49 of a second amplifier tube 50.

The rectangular wave $n$ is produced by applying the output of the tube 46 through a blocking capacitor 51 and a high impedance resistor 52 to a pair of diodes 53 and 54 which are connected to conduct in opposite directions. The resistors 55 and 56 of comparatively low resistance are connected in series with the diodes 53 and 54, respectively. A biasing voltage drop for opposing current flow through the diodes 53 and 54 is produced across the resistor 56 by connecting a source of voltage (not shown) thereacross, a resistor 57 being in series with the voltage source. Flow of current through the diodes causes this bias to become divided equally between diodes 53 and 54. Therefore the diodes 53 and 54 clip the applied wave $m$ symmetrically about its A.-C. axis by becoming conducting on alternate cycles when the signal voltage exceeds the D.-C. voltage drop across the resistors 55 and 56, respectively. The resulting rectangular wave $n$ is amplified and reversed in polarity by the tube 50. The rectangular wave $n$ and the flattened wave $m$ add in the portion of the anode resistors 48 and 49 that is common to the tubes 46 and 50 to produce the desired reciprocal wave 1/K as shown in Fig. 7.

If the wave $m$ is flattened correctly and if the waves $m$ and $n$ are added with the correct relative amplitudes, the resulting signal will be substantially a true reciprocal of the wave K for a considerable amplitude range. The waves $m$ and $n$ may be mixed with the correct relative amplitudes by adjusting a variable tap 58 on the anode resistor 48. The correct shaping of the flattened wave $m$ may be obtained by selecting a non-linear resistor unit 43 having a suitable voltage-resistance characteristic and by adjusting the value of the resistor 42.

Since the above-described reciprocal circuit is purely resistive whereby its operation is independent of frequency, if it is adjusted to produce the reciprocal of an applied wave having one wave form, it will then produce the reciprocal of an applied wave regardless of its wave form.

The multiplier of the present invention makes use of a circuit having the property of providing an instantaneous voltage which is proportional to the square of the instantaneous input voltage for a reasonable voltage swing in a single polarity. Such circuits will be referred to as "squaring circuits" and will be designated "Q" where referred to in this specification. In the preferred form the waves S and K, to be multiplied, are added together with four different polarity combinations and "squared" in four different channels. Then the four squared signals are added with suitable polarities to obtain the product SK in the output as illustrated in the following equations:

$$\begin{aligned}
\text{Output of } Q_1 &= (S+K+A)^2 &&= S^2+K^2+A^2+2SK+2KA+2AS \\
\text{Output of } Q_3 &= (-S-K+A)^2 &&= S^2+K^2+A^2+2SK-2KA-2AS \\
\text{Output of } Q_4 &= -(-(-S+K-A))^2 = -(S-K+A)^2 &&= -S^2-K^2-A^2+2SK+2KA-2AS \\
\text{Output of } Q_2 &= -(-(S-K-A))^2 = -(-S+K+A)^2 &&= -S^2-K^2-A^2+2SK-2KA+2AS \\
\hline
\text{Sum output} &= 8SK
\end{aligned}$$

The term A is the D.-C. bias added to the A.-C. waves to cause all the swing to have the same polarity with respect to the squaring device.

Figure 4:
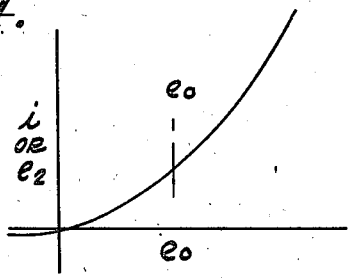
Figure 4 is a graph which is referred to in explaining the invention.

The squaring circuit here devised employs a plurality of small copper oxide rectifiers known commercially as "Varistors," the operation of which will be explained by reference to Fig. 3, wherein the varistor $V_5$ is supplied with a voltage $e_0$, which causes a current $i$ to flow as indicated by the graph of Fig. 4. Because of the particular variable resistance of the varistor the current is substantially proportional to the square of the voltage for a reasonable swing in the positive direction. (This is not true for negative voltage.) A suitable series resistance $R_{17}$ is used to give an output voltage proportional to this current. It has been found that there is a value for the resistance of resistor $R_{17}$ which provides an output voltage most nearly in accordance with a "square law" when a given varistor is used. Thus, by reference to Fig. 4, it will be seen that the input voltage $e_0 = e_1 + A$, which through the action of varistor $V_5$ given an output voltage $e_2$ equal to $(e_1+A)^2$.

Referring to Fig. 6 of the drawings, the preferred embodiment of the invention is shown wherein the audio-frequency signals to be multiplied are S and K. As shown, these signals are applied respectively to the grids of two amplifier tubes 61 and 62, which have push-pull outputs S and −S, and K and −K.

In order that the desired sum voltages be obtained, the signals S and K are applied to a network of resistors in the following manner: Signals S and K respectively traverse resistors $R_6$ and $R_7$ to provide a signal proportional to $(S+K)$ at point $(S+K)$; the signals S and −K respectively traverse resistors $R_5$ and $R_{12}$ to provide signal $(S-K)$; the signals −S and −K respectively traverse resistors $R_{10}$ and $R_{11}$ to provide signal $(-S-K)$; and the signals −S and K transverse respectively resistors $R_9$ and $R_8$ to provide signal $(-S+K)$. Thus, at each of the four junction points, a sum of voltage is obtained as designated in the circuit diagram. As shown, the network also includes resistors $R_{13}$ and $R_{15}$ leading respectively from points $(S-K)$ and $(-S+K)$ to ground, and resistors $R_{14}$ and $R_{16}$ leading respectively from points $(S+K)$ and $(-S-K)$ to the source of bias voltage which is applied at the two places $+B_1$. An 8000 ohm resistance has been found satisfactory for the resistors $R_{13}$, $R_{14}$, $R_{15}$ and $R_{16}$, while 100,000 ohm resistance has been taken as the value of resistors $R_5$, $R_6$, $R_7$, $R_8$, $R_9$, $R_{10}$, $R_{11}$ and $R_{12}$.

The sum voltages at the four points of the network are applied with bias voltage A and $-A$ to four varistors $V_1$, $V_2$, $V_3$, and $V_4$ respectively, all of which control the current through the common resistor 17 to give the product output SK. As explained by reference to Figs. 3 and 4, the output across $R_{17}$ is proportional to the sum of all the voltages which would have been generated if each varistor had supplied current to a separate resistor, as indicated by the foregoing squaring equations. It is to be noted that the varistors $V_2$ and $V_4$ are connected with opposite polarities from the varistors $V_1$ and $V_3$ so that the D. C. bias voltages must be different. By reference respectively to the third and fourth equations it will be seen that the values $(-S+K-A)$ and $(S-K-A)$ are each preceded by another minus sign and included in brackets before squaring to properly indicate mathematically the effect of the reversed connection on these two varistors. These five equations show that, ideally, only the desired voltage SK is produced in the output circuit of Fig. 6.

Figure 5:
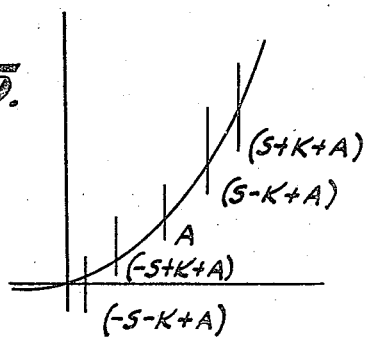
Figure 5 is a second graph which is referred to in explaining the invention.

For compensating for small dissimilarities in the varistors and other circuit elements, it has been found desirable to provide variable resistors $R_1$ and $R_3$ for adjusting the relative amplitudes of $-S$ and $-K$.

Where vacuum tubes have been utilized as squaring circuits in a secret communication system of the type here under consideration, it has been found that many spurious components are a part of the output signal and thereby rather seriously complicate the separation of the message signal from the impressed code signal. In the present invention, the spurious components of the output signal, caused by slight departure of the varistor characteristics from a true square law over an extended swing are so reduced as to be practically negligible. Thus, from Fig. 5, it can be seen that at any instant the voltages on the four varistors are distributed symmetrically with respect to the bias point A. This can be shown to lend a property for suppressing the generation of spurious components. For example, if the curve of Fig. 5 has a square law at point A, but above A it exceeds a square law in steepness, and below A it rises at a rate slower than the square law, then the instantaneous current dut to component $(S+K+A)$ will be too great, but that due to $(-S-K+A)$ will be too small and thereby tend to cancel the error. Similarly, errors arising from inputs $(S-K+A)$ and $(-S+K+A)$ will tend to cancel.

While in the foregoing the term "multiplying circuit" has been used to define the novel circuit, it will be seen that the circuit actually is a sort of modulator which is completely balanced in the sense that only the side band frequencies are produced, while the input frequencies and the harmonics thereof are suppressed.

Having thus described my invention, I claim:

1. An apparatus for obtaining the product of a plurality of voltages, comprising devices respectively responsive to two input waves, said devices functioning to add said waves in four different polarity combinations, means for applying voltages of predetermined polarity to the respective combinations, means for squaring said combinations respectively in four different channels, and means responsive to the voltage of said channels for producing an output voltage proportional to the sum of said voltages, whereby the product of said incoming waves is obtained.

2. An apparatus for obtaining the product of a plurality of voltages, comprising devices respectively responsive to two input waves, said devices functioning to add said waves in a plurality of different polarity combinations, means for applying voltages of predetermined polarity to the respective combinations, means for squaring said combinations respectively, each in a different channel, and means responsive to the aggregate voltage of said channels for producing an output voltage proportional to the sum of said voltages, whereby the product of said incoming waves is obtained.

3. An apparatus for obtaining the product of a plurality of voltages, comprising vacuum tubes in push-pull arrangement respectively responsive to two input waves, said tubes functioning to add said waves in a plurality of different polarity combinations, means for applying voltages of predetermined polarity to the respective combinations, means for squaring said combinations respectively, each in a different channel, and means responsive to the aggregate voltage of said channels for producing an output voltage proportional to the sum of said voltages, whereby the product of said incoming waves is obtained said product being a multiplication of said wave magnitudes as measured from the alternating-current axes of said waves.

4. An apparatus for obtaining the product of a plurality of voltages, comprising devices respectively responsive to a message signal and a code signal, said devices functioning to add said signals in four different polarity combinations, means for applying voltages of predetermined polarity to the respective combinations, means for squaring said combinations respectively in four different channels, and means responsive to the voltage of said channels for producing an output voltage proportional to the sum of said voltages whereby the product of said signals is obtained said product being a multiplication of said signal magnitudes as measured from the alternating-current axes of said signals.

5. An apparatus for obtaining the product of a plurality of voltages, comprising devices respectively responsive to two input waves, said devices functioning to add said waves in four different polarity combinations, means for applying voltages of predetermined polarity to the respective combinations, means including rectifiers for squaring said combinations respectively in four different channels, and means responsive to the voltage of said channels for producing an output voltage proportional to the sum of said voltages, whereby the product of said input waves is obtained said product being a multiplication of said wave magnitudes as measured from the alternating-current axes of said waves.

6. An apparatus for obtaining the product of a plurality of voltages, comprising devices respectively responsive to two input waves, said devices functioning to add said waves in four different polarity combinations, means for applying voltages of predetermined polarity to the respective combinations, means including varistors for squaring said combinations respectively in four different channels, and means responsive to the voltage of said channels for producing an output voltage proportional to the sum of said voltages, whereby the product of said input waves is obtained said product being a multiplication of said wave magnitudes as measured from the alternating-current axes of said waves.

7. An apparatus for obtaining the product of a plurality of voltages, comprising devices respectively responsive to two input waves, said devices functioning to add said waves in four different polarity combinations, means for applying voltages of one polarity to certain of said combinations and voltages of opposite polarity to others of said combinations, means including varistors for squaring said combinations respectively in four different channels, and means responsive to the voltage of said channels for producing an output voltage proportional to the sum of said voltages, whereby the product of said input waves is obtained said product being a multiplication of said wave magnitudes as measured from the alternating-current axes of said waves.

8. An apparatus for producing an output A. C. wave, comprising devices respectively responsive to two input waves, said devices functioning to add said waves in a plurality of combinations, and means associated with said combinations and including an electrical squaring network plus a biasing voltage for producing an output A. C. wave having an instantaneous value proportional to the product of the corresponding values of said input waves said product being a multiplication of said wave magnitudes as measured from the alternating-current axes of said waves.

9. The method of producing an output A. C. wave having an instantaneous value proportional to the product of the corresponding values of two input waves S and K which comprises the step of separating S into $+S$ and $-S$ outputs, and separating K into $+K$ and $-K$ outputs, obtaining from said outputs the sum voltages $(S+K)$, $(-S-K)$, $(-S+K)$, and $(S-K)$, applying bias voltages to the respective sum of voltages, squaring the respective resultant voltages, and controlling the common output, whereby the A. C. wave output is proportional to the sum of all the voltages.

10. The method of producing an output A. C. wave having instantaneous values proportional to the corresponding values of two input waves S and K which comprises generating the waves $-S$ and $-K$ which are waves S and K, respectively, with reversed polarities; generating the sum voltage waves $(S+K)$, $(-S-K)$, $(-S+K)$, and $(S-K)$; squaring each sum voltage wave; and combining the squared waves to form the product wave SK.

ALDA VERNON BEDFORD.